UNITED STATES PATENT OFFICE.

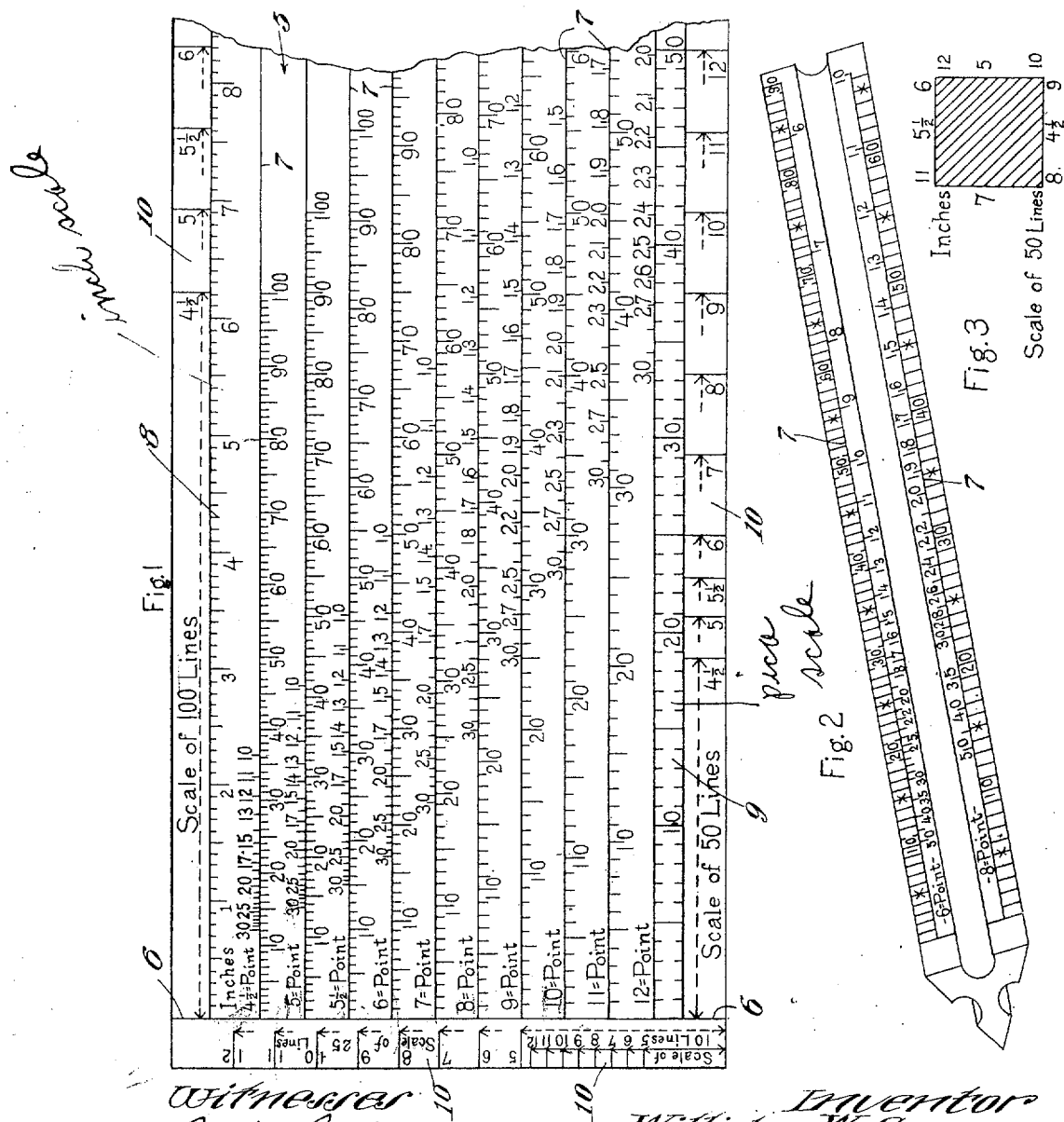

WILLISTON W. GREENWOOD, OF LOS ANGELES, CALIFORNIA.

TYPE-SCALE.

975,689.  Specification of Letters Patent.  Patented Nov. 15, 1910.

Application filed September 11, 1907. Serial No. 392,286.

*To all whom it may concern:*

Be it known that I, WILLISTON W. GREENWOOD, a citizen of the United States, residing at Los Angeles, county of Los Angeles, State of California, have invented new and useful Improvements in Type-Scales, of which the following is a specification.

This invention relates to an improvement on the device described and illustrated in my application for United States Letters Patent for type scale filed on or about August 26, 1907, and an object thereof is to provide a scale whose divisions shall give the column length of a thousand ems of type of various sizes set in various column widths.

A further object is to provide a convenient line measure whereby the number of lines of type of various sizes may be ascertained from the length of column occupied.

A further object is to provide the two aforesaid scales in juxtaposition with each other so that the terms of one may be readily converted into the terms of the other.

A further object is to provide scales of various common numbers of lines for the various sizes of type.

A further object is to provide the above named scales in efficient form and in combination with certain other scales of common units of measure.

I accomplish these objects by means of the device described herein and illustrated in the accompanying drawings in which:—

Figure 1,—is a face view of a portion of my scale as adapted to be placed upon a single surface. Fig. 2,—is a perspective view showing an adaptation of a part of my scale to a triangular prismatic body. Fig. 3,—is a sectional view illustrating an arrangement of the various parts of my scale around the faces of a square prismatic body.

Referring to the drawings and more particularly to Fig. 1, 5 designates a sheet of suitable material such as cardboard, ivory or the like on which are printed or engraved the divisions and designations therefor about to be described. Only a portion of the complete scale is shown as the removed portion is constructed in a manner exactly similar to the portion shown. Near the left hand end of sheet 5 a transverse base line 6 is ruled which forms the base for longitudinal parallel lines 7 on which the different divisions of the scale are laid off. Each one of these parallel lines is concerned with and applies to a particular size of type and in the scale shown the sizes range from four and one half point type to twelve point type. As the nature of the divisions for all these lines is exactly the same an explanation in detail of one of the same will suffice for all.

Taking the line labeled "5-point" it will be seen that there are two sets of divisions, one above and the other below the line. The divisions above the line indicate the column length of a thousand ems of five point type set in columns of the width in picas indicated by the figures attached to the various divisions. Thus the division designated "30" is at a distance from the base line 6 equal to the column length of one thousand ems of five point type set in a column thirty picas wide. Similarly the distance of the division designated "25" from base line 6 is equal to the length of one thousand ems of five point type set in a column twenty-five picas wide. The remaining divisions give corresponding results as do also the upper divisions on all the longitudinal parallel lines. Thus it will be manifest that by the use of this portion of the scale I am enabled to ascertain quickly and accurately the column space which a given number of ems of type will occupy.

The divisions below lines 7 will be seen to be laid off in a regular and even manner whereas the divisions above the lines increase in length as they progress to the right. The divisions below the line are each equal in length to the height of an em of the particular sized type to which the divisions belong. Thus each division represents the column length taken up by a single line of type of that particular size. Therefore if the length of a column of type of any particular size is known the number of lines may be ascertained by applying that length to the divisions below the line. By having these two scales in juxtaposition it is possible to convert the terms of one into the terms of the other. Thus, if it is wished to ascertain how many lines a thousand ems of eight point type set in a column fifteen picas wide will occupy the scale gives the desired information as forty-five lines, the forty-fifth division below the eight point line being approximately under the fifteenth division above the eight point line.

Near each edge of the scale are laid off scales of common units such as an inch scale 8 and a pica scale 9. At the edges of the sheet are scales 10 of "100 lines," of "50 lines," etc. These scales as their designations indicate give the column length of the designated number of lines for different sizes of type as the numbers on the different transverse divisions signify. By these divisions the space occupied by the given number of lines may be quickly ascertained and applied to the space which is available or applied to a scale to find that length in terms of some unit. These last described scales may be laid off directly over the scale of inches or the scale of picas in a different color from the unit scale so as to be distinguishable therefrom. This position enables the length in units to be read directly without resort to any sort of measuring device or dividers.

It will be observed from the foregoing description that I have provided a scale which is particularly useful in measuring type as it presents the necessary divisions in a convenient and practical form. Besides making measurements for type set solid my scale is also useful in making measurements for spaced type or type which has been leaded. This is accomplished by merely making the appropriate measurements for the type as it is increased in size by the leads. Thus if it were wished to be known how much column space a thousand ems of eight point type leaded two points in a column twenty picas wide the desired information is obtained as follows:—From the eight point scale it will be observed that the number of lines occupied by a thousand ems of eight point type set in a column twenty picas wide is thirty-four as the thirty-fourth division under the eight point line approximately registers with the twentieth division above that line. Dropping down to the ten point line, as the type is leaded two points, the column length occupied by thirty-four lines is given by the distance from base line 6 to the thirty-fourth division below the ten point line. This and other uses will appear in practical operation as occasions arise.

In Fig. 3 I have indicated the placement of my scale on a bar of square cross section. In this arrangement the scales which are most commonly used are placed along the edges of the scale and the ones less frequently used along the portions intermediate the edges. This construction provides a scale which is at once durable and convenient as it may be made of metal or any other durable material.

Having described my invention what I claim as new and desire to secure by Letters Patent is:—

1. A type-scale comprising a material surface, said surface having a line ruled thereon, said line being denominated for a specific size of type; and, further, having an origin-point located in said line and divisional points laid off along said line, said points being respectively denominated for various column-widths in which type may be set, said points marking off along said line from said origin distances equal respectively to the various column-lengths of a constant quantity of said type set in the respective column-widths indicated by the said divisional denominations, all of said column-lengths being laid off starting from said origin, and, overlapping each other, terminating respectively with said divisional points.

2. The combination, in a type-scale comprising a material surface and having a line ruled thereon denominated for a specific size of type, of a series of divisional points laid off on one side of said line and denominated respectively for various column-widths in which type may be set, said divisional points marking off from a common origin-point in said line distances equal respectively to the various column-lengths of a unit-quantity of type of said size when set in columns of the widths indicated; with a series of equal divisions laid off on the other side of said line, said divisions being equal to a lineal em of said specific size of type, and said divisions being determined by divisional points consecutively numbered from said origin-point; substantially as shown and described.

3. A type-scale comprising a material surface, said surface having ruled thereon:—a transverse baseline as the origin of measurement and a plurality of longitudinal lines starting from said baseline, said longitudinal lines being denominated respectively for different sizes of type; each of said lines having divisional points respectively denominated for different column-widths, said points marking off from said baseline distances equal respectively to the various column-lengths of a unit-quantity of type of the column-widths and sizes indicated.

4. A type-scale comprising a material surface, said surface having a line ruled thereon, said line being designated for a certain size of type, and having an origin-point designated on said line, and having divisional points on said line designated for different widths of column, said divisional points being laid off at distances from said origin-point respectively equal to the different column-lengths which a constant number of ems of the said size of type would occupy when arranged in the said designated widths of column; each of said column-lengths, beginning at said origin-point and terminating at its said respective divisional point, constituting a single unit of measurement for type of the size and column-width indicated respectively by its line- and divisional-point designations.

5. A type-scale comprising a material surface, said surface having a plurality of lines ruled thereon, said lines being respectively designated for different sizes of type, and having an origin-point designated on each of said lines, and having divisional points on each of said lines designated for different widths of column, said divisional points being laid off at distances from said origin-points respectively equal to the various column-lengths which a constant number of ems of the said sizes of type will occupy when arranged in said designated widths of column; each of said column-lengths, beginning at its said origin-point and terminating at its said respective divisional point, constituting a single unit of measurement for type of the size and column-width indicated respectively by its line- and divisional-point designations.

6. The combination, in a type scale, of a series of divisions laid off on one side of a line, each of said divisions starting from a common origin-point in said line and being equal respectively to the various column-lengths of a constant quantity of a specified size of type, when set in various widths of column, the divisional points limiting said divisions from the origin-point being denominated for said various widths of column; with a line-gage having equal divisions, laid off on the other side of said line, said divisions being consecutively numbered from said origin-point, each of said divisions being equal to a lineal em of the said size of type; substantially as shown and described.

In witness that I claim the foregoing I have hereunto subscribed my name this 31st day of August, 1907.

WILLISTON W. GREENWOOD.

Witnesses:
 EDMUND A. STRAUSE,
 OLLIE PALMER.